June 7, 1932.  W. H. PARKER  1,861,715

LIQUID LEVEL INDICATING MEANS

Filed Sept. 27, 1926

Witness:
R. Burkhardt.

Inventor:
Walter H. Parker,
By Wilkinson, Huxley, Byron & Knight
Attys.

Patented June 7, 1932

1,861,715

UNITED STATES PATENT OFFICE

WALTER HERBERT PARKER, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

LIQUID LEVEL INDICATING MEANS

Application filed September 27, 1926. Serial No. 137,936.

My invention relates to improvements in liquid dispensing devices and more particularly to improved calibrated measuring reservoirs adapted for use on a visible measure dispensing device.

My invention has to do with an improved reservoir which is of glass or other transparent substance and which serves as a measuring container for the dispensed liquid. It has been found in practice that these glass cylindrical containers cannot be made with the same precision and accuracy as can containers of metal or other substances, with the result that in supplying a glass container for any particular dispensing device it is necessary that each be calibrated after it is installed in operative relation. In this type of device, it is customary to have a movable outlet pipe inside of the container which is adjustable to various positions on a vertical axis, the elevation of which determines the measured quantity of liquid to be dispensed. The operator, after adjusting the outlet to measure any desired quantity, fills the measuring container slightly above the level of the outlet pipe and allows the surplus to run out to the level at which the outlet is set. In connection with this type of means for determining the quantity of liquid dispensed, a graduated scale is employed having a plurality of markers mounted thereon each positioned so as to indicate the level of the liquid in the container for a particular quantity contained. Heretofore, it has been the practice to mount the scale on the outside of the container and due to the slight irregularities found in each container, it was necessary to adjust the position of the markers after the container had been installed and the level of the liquid for the specified quantities ascertained by trial.

One of the objects of my invention is to provide a calibrated container comprising a transparent container wall and a scale as an assembled unit to be applied to a visible measure dispensing device.

Another object of my invention is to provide a transparent container wall for a dispensing device which may be supplied as a single unit already properly calibrated and be installed and ready for use as supplied.

Another object of my invention is to provide a scale for a transparent container wall mounted on the inside and provided with adjustable liquid level markers so that calibration of the particular cylinder may be effected prior to installation and the entire combination maintained intact as a unit ready to be installed as supplied.

With these and various other objects in view, the invention consists of certain novel features of construction and operation as will be more fully described and particularly pointed out in the specification, drawing and claims appended hereto.

In the drawing, wherein like reference characters are used to designate like parts Figure 1 is an elevation partly in cross-section of a portion of a transparent container equipped with my calibrated scale;

The various novel features of the invention will be apparent from the following description and drawing and will be particularly pointed out in the appended claims.

Figure 1:
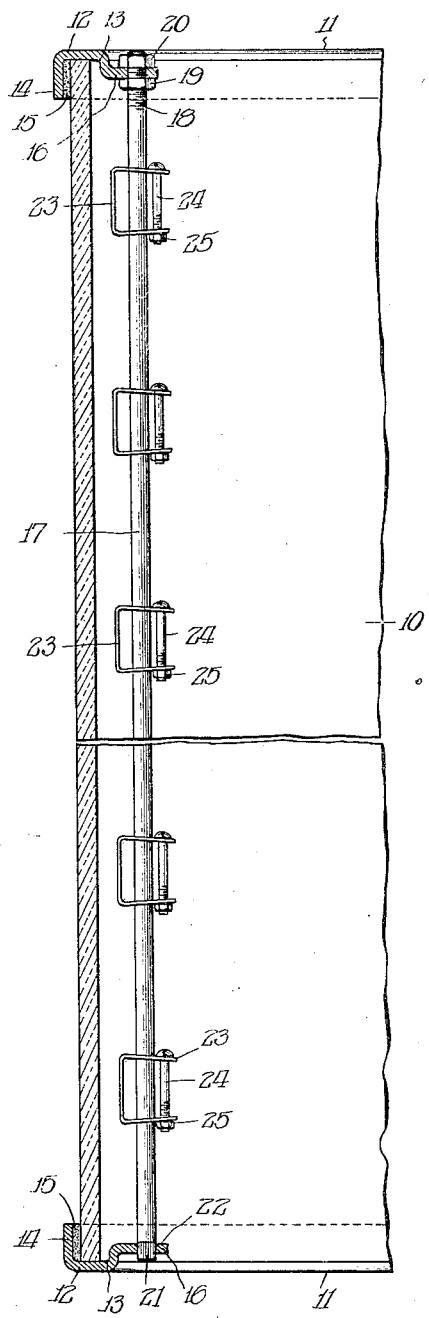
Figure 2:
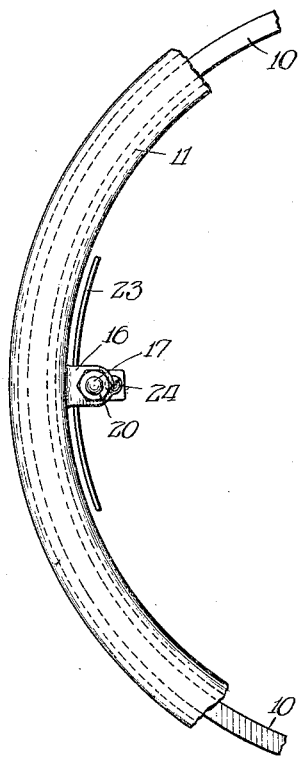
Figure 2 is a fragmentary plan view of Figure 1.
Figure 3:
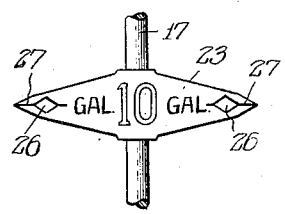
Figure 3 is an enlarged front elevation of one of the liquid level marking plates shown adjustably mounted on the supporting rod.

Referring to the drawing, it will be noted that my invention embodies a container wall 10 of glass or any other suitable transparent substance, shown in the figures of the drawing as cylindrical but which may be of any other suitable or desirable shape, having mounted at its upper and lower edges rims 11 bent as at 12 to form the annular grooves 13 for receiving the edges of the container wall 10. The rims are mounted in fixed position on the edges of the container wall by any suitable means such as by a paste, shown at 15, of any suitable character but preferably of litharge and glycerin, this paste being preferably positioned between the outer face of the wall and the lips 14 formed on the rims. On the inner face of the rim projecting radially inwardly a perforated tongue 16 is provided, the tongues on the upper and lower rims being so positioned relative to the container wall that their perforations lie in the same vertical axis. Positioned through and maintained in position by the perforated tongue 16 is a rod 17 which has its upper end threaded as at 18 and provided with securing nuts 19 and 20 positioned on the opposite sides of the upper tongue 16 and having its lower end squared as at 21 fit in the squared hole 22 in the lower tongue 16. Positioned in spaced relation along the length of the rod 17 are a plurality of liquid level markers 23 mounted for adjustment by means of the bolt 24 and nut 25; the front elevation of the marker 23, as shown in Figure 3, being provided with openings 26 at its opposite ends and a level indicating line 27 positioned on opposite sides of the opening 26 whereby level indicating means of different character are provided. This arrangement provides means for readily ascertaining whether or not the actual liquid level coincides with the indicated level, the liquid showing through the opening 26, the surface level line forming a continuation across the opening of line 27.

To assemble the device, the rims are attached to the container wall by paste or other means as indicated, the rims being so disposed that the perforations in the two tongues 16 lie in the same vertical axis. The necessary markers 23 are then roughly positioned in spaced relation on the rod 17 and the nut 19 is screwed on the upper end to a position further down on the rod than it will occupy when the parts are in final assembled relation. The markers are U-shaped in side elevation and are adapted to be bent by the tightening action of the bolt to cause the arms of the U to bind the rod so that they remain fixed in position having once been adjusted on the rod. With the parts in this position, the rod 17 is inserted through the perforation in the upper tongue 16 from the bottom side, the rod being lifted to a height sufficient to permit the lower squared nut 21 of the rod to be moved over and inserted through perforation 22 in the lower tongue 16. When thus placed, the upper nut 20 is placed on the end of the rod and screwed down to a position to properly fix the height of the rod 17 as it is desired, at which time the nut 19 is screwed upwardly to tightly embrace the lower portion of the tongue 16.

As an assembled unit, the particular container may be tested by the trial method and each marker adjusted to effect the desired calibration and the device maintained when supplied as a complete finally calibrated unit. It can be readily understood that a plurality of scales may be applied in a manner similar to that shown, as, for instance, positioned at a 90° angle or 180° angle so that the scales may be read from a plurality of directions, this, however, being merely a matter of selection and merely necessitating duplication of the structure above described.

It can be seen that this arrangement eliminates the necessity of calibrating after the pump is assembled, it makes for economy in construction, ease of assembly, and makes possible replacing a cylinder on a pump in service without calibrating it as a part of the pump.

It is of course to be understood that the invention is not to be limited to the exact embodiment shown. For instance, it is not contemplated that the particular kind of marker shown should be only applied to the measuring chamber, as for a fluid dispensing pump, but this marker may be readily adapted to be used on any kind of container, either one which is wholly transparent or has only a transparent part, and not only to those containers adapted to be applied or other devices as illustrated but to those that are to be used for liquid reservoirs per se, in which case it is to be understood, of course, that the container will have a closed bottom or base and preferably a removable top.

I claim:

1. In a visible measure dispensing device, a calibrated reservoir therefor including a container having a transparent wall with rims attached to its top and bottom edges, said rims having inwardly projecting perforated ears in vertical alignment, a rod positioned in said ears adjustably held at its upper end, markers comprising U-shaped members threaded on said rod and clamped in spaced relation throughout its length, the arms of said U-shaped markers having screw means therethrough to bind the markers in adjusted position on said rod.

2. An adjustable scale comprising a rod having adjustable markers threaded thereon, said markers each comprising a flexible plate bent to form a base portion and two arm portions, said base portion having a pointer and scale markings on its outer surface, and said arm portions being perforated to receive said rod, screw means penetrating perforations in the outer ends of said arms and adapted to be tightened to draw the arms together in binding relation with said rod.

3. A marker for a scale adapted to be adjustably clamped on a rod comprising a substantially U-shaped element having a base portion and two arms, said base portion having a pointer and scale markings on its outer surface, and said arms being perforated to receive a rod, and screw means penetrating perforations in the outer ends of said arms and adapted to be tightened to draw the arms together in binding relation with said rod.

4. In a device of the character described, the combination of a measuring chamber having at least a part thereof transparent, a supporting member, fixed with respect to said chamber, measuring means visibly associated within said chamber, said means having spaced markers secured to said member, said markers having aligned indicating means and independent apertures for receiving fluid, said apertures being aligned with said indicating means for determining the fluid level.

5. An article of manufacture comprising a base portion having intelligible indicatory characters thereon, independent aligned indicating apertures disposed in way of said indicatory characters, and spaced resilient securing means provided on said base portion for holding said article on a support.

6. An article of manufacture comprising a base portion having intelligible indicatory characters thereon independent aligned indicating apertures disposed in way of said indicatory characters, and spaced resilient securing means having portions for embracing a support and portions adapted to receive means for moving said securing means into securing position.

7. An adjustable scale including a rod having adjustable markers threaded thereon, said markers each comprising a plate bent to form a base portion and two arm portions, said base portion having a pointer and scale markings on its outer surface, and said arm portions having perforations therein to receive said rod, means penetrating other perforations in said arms and adapted to be operated to move the arms in binding relation with said rod.

8. As an article of manufacture, a marker including a base portion having intelligible indicatory characters and independent level indicating means of different characteristics, and spaced resilient securing means integral with said base portion having portions for embracing a support and portions adapted to receive means for moving said securing means into securing position.

9. As an article of manufacture, a marker including a base portion of substantially diamond shape having aligned level indicating vertices, said base portion having level indicating apertures disposed adjacent said level indicating vertices, and spaced resilient securing means integral with the other of said vertices having portions for embracing a support and portions adapted to receive means for moving said securing means into securing position.

Signed at Rochester, Pennsylvania, this 20th day of September, 1926.

WALTER HERBERT PARKER.